(12) United States Patent
Luedtke

(10) Patent No.: US 10,744,891 B2
(45) Date of Patent: Aug. 18, 2020

(54) VOLTAGE CONTROL FOR ALTERNATOR MODE IN ELECTRIFIED VEHICLES

(71) Applicant: Daniel R Luedtke, Beverly Hills, MI (US)

(72) Inventor: Daniel R Luedtke, Beverly Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 345 days.

(21) Appl. No.: 15/837,101

(22) Filed: Dec. 11, 2017

(65) Prior Publication Data

US 2019/0176630 A1  Jun. 13, 2019

(51) Int. Cl.
| | |
|---|---|
| H02M 3/04 | (2006.01) |
| B60L 50/52 | (2019.01) |
| B60L 58/20 | (2019.01) |
| B60L 3/00 | (2019.01) |
| B60L 3/04 | (2006.01) |
| B60L 50/61 | (2019.01) |

(52) U.S. Cl.
CPC .............. *B60L 50/52* (2019.02); *B60L 3/0046* (2013.01); *B60L 3/04* (2013.01); *B60L 50/61* (2019.02); *B60L 58/20* (2019.02); *H02M 3/04* (2013.01); *B60L 2210/10* (2013.01)

(58) Field of Classification Search
CPC .. B60L 50/52; B60L 50/61; B60L 3/04; B60L 3/0046; B60L 58/20; B60L 2210/10; H02M 3/04
See application file for complete search history.

(56) References Cited

U.S. PATENT DOCUMENTS

| | | | |
|---|---|---|---|
| 6,959,777 B2 * | 11/2005 | Beckerman | B60T 1/10 180/65.1 |
| 7,252,165 B1 * | 8/2007 | Gruenwald | B60L 1/003 180/65.25 |
| 7,253,584 B2 * | 8/2007 | Souther | B60L 58/10 320/104 |
| 9,221,458 B1 * | 12/2015 | Tamai | B60W 20/40 |
| 9,266,433 B2 * | 2/2016 | Bilezikjian | B60L 3/0046 |
| 2002/0179348 A1 | 12/2002 | Tamai et al. | |

(Continued)

OTHER PUBLICATIONS

International Search Report and Written Opinion dated Mar. 15, 2019 for International Application No. PCT/US2018/064377, International Filing date Dec. 7, 2018.

*Primary Examiner* — Jared Fureman
*Assistant Examiner* — Michael J Warmflash
(74) *Attorney, Agent, or Firm* — Ralph E. Smith

(57) ABSTRACT

A system comprises a high voltage (HV) battery system connected to an HV bus, a motor generator unit (MGU) connected to the HV bus, a main contactor disposed on the HV bus between the MGU and the HV battery system such that, when the main contactor is closed, the HV battery system stabilizes a voltage of the HV bus, a low voltage (LV) battery system connected to an LV bus and configured to stabilize a voltage of the LV bus when the main contactor is open or malfunctioning, a direct current to direct current (DC-DC) converter connected to the HV bus and the LV bus, and a controller configured to (i) when the main contactor is closed, control the DC-DC converter to stabilize the LV bus voltage, and (ii) when the main contactor is open or malfunctioning, control the DC-DC converter to stabilize the HV bus voltage.

14 Claims, 4 Drawing Sheets

(56) References Cited

U.S. PATENT DOCUMENTS

| | | | |
|---|---|---|---|
| 2003/0029654 A1* | 2/2003 | Shimane | B60L 3/0046 |
| | | | 180/65.29 |
| 2009/0103341 A1* | 4/2009 | Lee | B60W 10/26 |
| | | | 363/124 |
| 2010/0236851 A1* | 9/2010 | Van Maanen | B60L 3/0046 |
| | | | 180/65.265 |
| 2012/0105001 A1 | 5/2012 | Gallegos et al. | |
| 2015/0295421 A1* | 10/2015 | Blakemore | H02J 7/007 |
| | | | 320/129 |
| 2016/0303992 A1* | 10/2016 | Lovett | B60W 50/14 |
| 2016/0332533 A1* | 11/2016 | Tistle | B60L 11/1872 |
| 2017/0093316 A1* | 3/2017 | Toyora | B60L 3/0046 |

\* cited by examiner

VOLTAGE CONTROL FOR ALTERNATOR MODE IN ELECTRIFIED VEHICLES

FIELD

The present application generally relates to electrified vehicles and, more particularly, to voltage control techniques for an alternator mode in electrified vehicles.

BACKGROUND

One type of hybrid electric vehicle (HEV), commonly referred to as a mild hybrid vehicle or mild HEV, includes an engine and a belt-driven starter generator (BSG) unit. The BSG unit includes a battery system (e.g., 48 or 400 volts) that supplies a current to drive an electric motor, which in turn drives a crankshaft of the engine via a belt to assist in starting or restarting the engine. This enables the engine, for example, to be periodically turned off during certain operating periods and then quickly restarted when drive torque is required. This is also commonly referred to as engine start/stop engine operation. Such operation provides for increased fuel economy. The BSG unit is also configured to convert torque generated by the engine at the crankshaft to electrical energy for powering or recharging components, such as the battery system of the BSG unit.

A DC-DC converter is optionally implemented to step-down the voltage of the battery system to a lesser voltage (e.g., 12 volts) for recharging another battery (e.g., a lead-acid battery) that powers vehicle accessory loads and/or for directly powering the vehicle accessory loads. When a main contactor of the battery system opens due to a fault condition, a motor generator unit (MGU) typically maintains the voltage on the high voltage bus. The MGU's responsiveness, however, is relatively slow and it has a relatively low capacitance. Thus, additional energy storage devices (e.g., capacitors) must be implemented to adequately maintain the high voltage bus voltage, which increases costs, weight, and packaging space. This may additionally or alternatively require the use of a more expensive MGU capable of maximized responsiveness. Accordingly, while such electrified vehicle control systems work well for their intended purpose, there remains a need for improvement in the relevant art.

SUMMARY

According to one example aspect of the invention, an electrified powertrain of an electrified vehicle is presented. In one exemplary implementation, the electrified powertrain comprises: a high voltage (HV) battery system connected to an HV bus; a motor generator unit (MGU) connected to the HV bus; a main contactor disposed on the HV bus between the MGU and the HV battery system such that, when the main contactor is closed, the HV battery system stabilizes a voltage of the HV bus; a low voltage (LV) battery system connected to an LV bus and configured to stabilize a voltage of the LV bus when the main contactor is open or malfunctioning; a direct current to direct current (DC-DC) converter connected to the HV bus and the LV bus; and a controller configured to: when the main contactor is closed, control the DC-DC converter to stabilize the LV bus voltage; and when the main contactor is open or malfunctioning, control the DC-DC converter to stabilize the HV bus voltage.

In some implementations, the controller includes a DC-DC control circuit that generates a duty cycle for the DC-DC converter based on a command signal. In some implementations, the controller includes an LV control circuit that generates a first error signal based on a difference between a target LV bus voltage and the LV bus voltage. In some implementations, the controller further includes: an HV control circuit that generates a second error signal based on a negative of a difference between a target HV bus voltage and the HV bus voltage; and an arbitrator circuit that receives the first and second error signals and that determines whether to output the first or second error signal to the DC-DC control circuit as the command signal.

In some implementations, the HV control circuit generates the second error signal based on a product of (i) the negative of the difference between the target HV bus voltage and the HV bus voltage and (ii) a tunable gain factor. In some implementations, the HV control circuit further comprises a proportional-integral (PI) or proportional-integral-derivative (PID) controller. In some implementations, the arbitrator circuit prioritizes the first error signal from the LV control circuit over the second error signal from the HV control circuit in outputting the command signal.

In some implementations, the main contactor opens in response to an ambient temperature outside of a predetermined operating range. In some implementations, the main contactor opens in response to a parameter of the HV battery system exceeding a threshold. In some implementations, when the main contactor is open or malfunctioning, the controller is configured to control the DC-DC converter to stabilize the HV bus voltage such that additional energy storage devices are not required or smaller energy storage devices are usable to stabilize the HV bus voltage.

According to another example aspect of the invention, a method of controlling a direct current to direct current (DC-DC) converter of an electrified powertrain of an electrified vehicle is presented. In one exemplary implementation, the method comprises: determining, by a controller of the electrified powertrain, a state of a main contactor disposed on a high voltage (HV) bus between a motor generator unit (MGU) and an HV battery system; in response to determining that the main contactor is open or malfunctioning, controlling, by the controller, the DC-DC converter to stabilize a voltage of the HV bus; in response to determining that the main contactor is closed, controlling, by the controller, the DC-DC converter to stabilize a voltage of a low voltage (LV) bus connected to an LV battery system, wherein when the main contactor is closed, the HV battery system stabilizes the HV bus voltage, such that additional energy storage devices are not required to stabilize the HV bus voltage, and the LV battery system stabilizes the LV bus voltage.

In some implementations, the method further comprises generating, by a DC-DC control circuit of the controller, a duty cycle for the DC-DC converter based on a command signal. In some implementations, the method further comprises generating, by an LV control circuit of the controller, a first error signal based on a difference between a target LV bus voltage and the LV bus voltage. In some implementations, the method further comprises: generating, by an HV control circuit of the controller, a second error signal based on a negative of a difference between a target HV bus voltage and the HV bus voltage; receiving, by an arbitrator circuit of the controller, the first and second error signals; and determining, by the arbitrator circuit, whether to output the first or second error signal to the DC-DC control circuit as the command signal.

In some implementations, the method further comprises generating, by the HV control circuit, the second error signal based on a product of (i) the negative of the difference between the target HV bus voltage and the HV bus voltage and (ii) a tunable gain factor. In some implementations, generating the second error signal further comprises utilizing a proportional-integral (PI) or proportional-integral-derivative (PID) controller. In some implementations, the method further comprises prioritizing, by the arbitrator circuit, the first error signal from the LV control circuit over the second error signal from the HV control circuit in outputting the command signal.

In some implementations, the main contactor opens in response to an ambient temperature outside of a predetermined operating range. In some implementations, the main contactor opens in response to a parameter of the HV battery system exceeding a threshold. In some implementations, the controlling of the DC-DC converter to stabilize the HV bus voltage when the main contactor is open is performed such that additional energy storage devices are not required or smaller energy storage devices are usable to stabilize the HV bus voltage.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously mentioned, conventional electrified vehicles utilize a motor generator unit (MGU) in conjunction with additional energy storage devices (e.g., capacitors) to maintain the voltage of a high voltage (e.g., 48 volt) bus when the main contactor is open. For example, the main contactor could open due to a malfunction or during extreme hot/cold ambient temperature conditions. The MGU, however, is relatively slow (e.g., ~50 Hertz (Hz) voltage control bandwidth) and the additional energy storage devices increase vehicle weight and costs. Accordingly, techniques are presented that utilize a direct current (DC) to DC converter and existing controller hardware to maintain the high voltage bus voltage. The DC-DC converter is inherently good at voltage control. The DC-DC converter is also faster (e.g., ~1000 Hz voltage control bandwidth) compared to the MGU and does not require additional energy storage devices and/or enables the use of smaller energy storage devices, thereby saving costs, weight, and packaging space.

Figure 1:
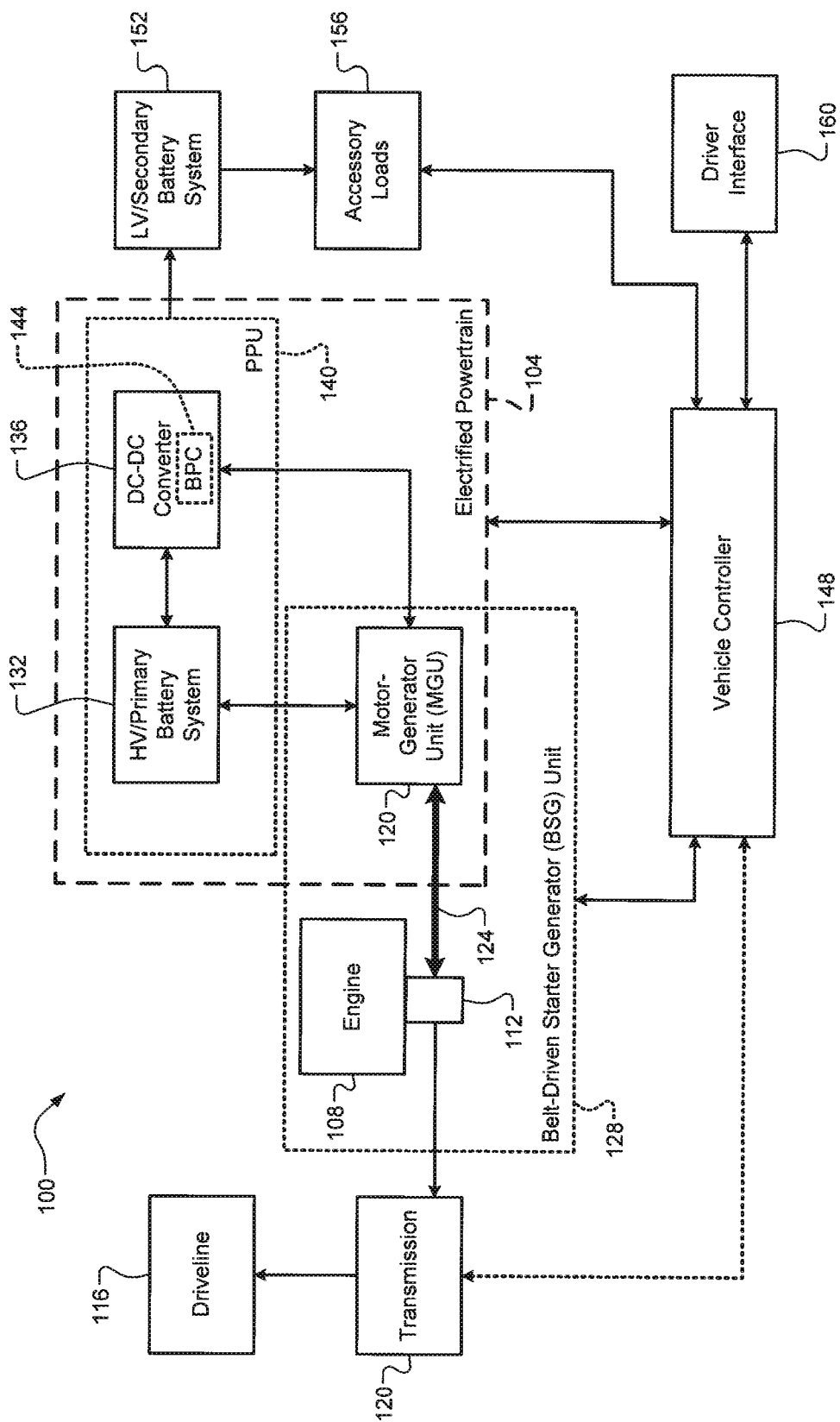
FIG. 1 is a functional block diagram of an exemplary electrified vehicle having a belt-driven starter generator (BSG) unit according to the principles of the present disclosure.

Referring now to FIG. 1, a functional block diagram of an example electrified vehicle 100 is illustrated. One example of the electrified vehicle 100 is a "mild hybrid" or "mild hybrid vehicle" that utilizes both an engine and an electric power source (e.g., an electric motor) during operation. It will be appreciated, however, that the techniques disclosed herein are applicable to any hybrid electric vehicle (HEV), ranging from a mild hybrid vehicle to a plug-in hybrid electric vehicle (PHEV). As shown, the electrified vehicle 100 includes an electrified powertrain 104 and an internal combustion engine 108. The engine 108 is any suitable type of engine configured to combust a mixture of air and fuel (e.g., gasoline) within cylinders (not shown) to generate drive torque at a crankshaft 112. The drive torque at the crankshaft 112 is transferred to a driveline 116 via a transmission 120. The electrified powertrain 104 includes an MGU 120 that is, for example, coupled to the crankshaft 112 via a belt, chain, or other suitable drive linkage 124. It will be appreciated, however, that the MGU 120 could be coupled to any suitable vehicle drivetrain component (transmission input, transmission output, etc.). The MGU 120 is, for example, an electric motor that is also capable of operating as a generator.

In one implementation, the engine 108, the MGU 120, and the belt 124 collectively form a belt-driven starter generator (BSG) unit 128. One example of the MGU 120 is an induction motor. The electrified powertrain 104 further includes a high voltage (HV) or primary battery system 132 and a DC-DC converter 136. The HV battery system 132 and the DC-DC converter 136 collectively represent a power pack unit (PPU) 140. One example of the HV battery system 132 is a 48 volt lithium ion battery pack. In some implementations, the DC-DC converter 136 includes an on-board battery pack controller (BPC) 144. While the BPC 144 is shown, it will be appreciated that its functionality may also be performed by a vehicle controller 148. The vehicle controller 148 and the optional BPC 144 are collectively referred to as a "control system" of the vehicle hybrid 100.

The hybrid vehicle 100 further includes a low voltage (LV) or secondary battery system 152 (e.g., a 12 volt lead acid battery) and accessory loads 156 that are powered by the LV battery system 152. The PPU 140 also recharges the LV battery system 152. Examples of the accessory loads 156 are a heating, ventilating, and cooling (HVAC) system (e.g., an air conditioner) and a multimedia or infotainment system. The vehicle controller 148 controls the electrified powertrain 104 and the BSG unit 128. The vehicle controller 148 also controls the accessory loads 156 and communicates with a driver interface 160 that includes various components (an accelerator pedal, a display, etc.). While a single vehicle controller 148 is illustrated, it will be appreciated that there could be other sub-controllers, such as a controller for the DC-DC converter 136. The control system of the hybrid vehicle 100 is also configured to perform at least a portion of the techniques of the present disclosure.

Figure 2:
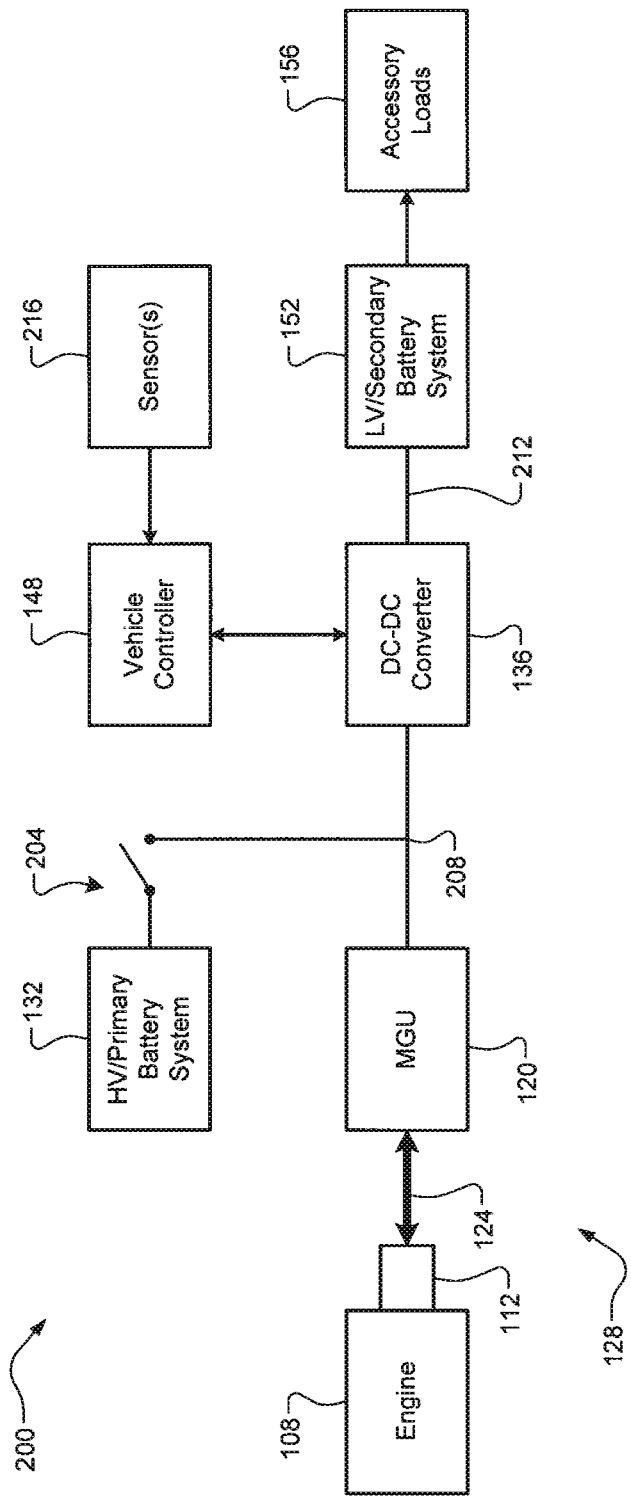
FIG. 2 is a functional block diagram of an exemplary electrical system of an electrified vehicle according to the principles of the present disclosure.

Referring now to FIG. 2, a diagram of an exemplary electrical system 200 of the hybrid vehicle 100 is illustrated. The electrical system 200 includes the MGU 120, the HV battery system 132, the DC-DC converter 136, the LV battery system 152, and the accessory loads 156. In one exemplary implementation, the electrical system 200 is described as including the engine 108, the crankshaft 112, and the belt 124 (as part of the BSG unit 128, which includes the MGU 120) and the vehicle controller 148. The electrical system 200 further includes a main contactor 204 (e.g., a high-voltage switch) in a high voltage bus 208 that connects the MGU 120, the HV battery system 132, and the DC-DC converter 136. The main contactor 204 is thus configured to open/close to disconnect/connect the HV battery system 132 to the DC-DC converter 136 and the MGU 120. It will be appreciated that the electrical system 200 may also be shown to include other components (e.g., the driver interface 160).

The main contactor 204 is configured to open due to a fault or malfunction. For example, in one implementation the vehicle controller 148 attempts to close the main contactor 204 at vehicle startup, but a fault or malfunction of the main contactor 204 prevents this from occurring. A signal or digital flag is received by the vehicle controller 148 that is indicative of such a fault condition. When the main contactor 204 is open, however, the HV battery system 132 is unable to stabilize the HV bus 208. Thus, start/stop operation of the engine 108 using the BSG unit 128 could be temporarily unavailable. A notification of the disabling of start/stop operation, in one exemplary implementation, is provided to a driver via the driver interface 160. Additionally, recharging of the LV battery system 152 may be temporarily unavailable, which would affect or prevent operation of the accessory loads 156 via an LV bus 212.

One example condition where the main contactor 204 opens is the ambient temperature being outside of a predetermined temperature range. Another example condition where the main contactor 204 opens is a parameter of the HV battery system 132 indicating that it would be non-optimal or unsafe to operate the HV battery system 132. One example of this parameter is an age or state of health (SOH) of the HV battery system. As previously mentioned, the main contactor 204 could also be open due to a malfunction. It will be appreciated that these are merely example scenarios where the main contactor 204 is open and that there could be other scenarios where the main contactor 204 is open. These parameter(s) could be measured, for example, using one or more sensors 216.

Figure 3:
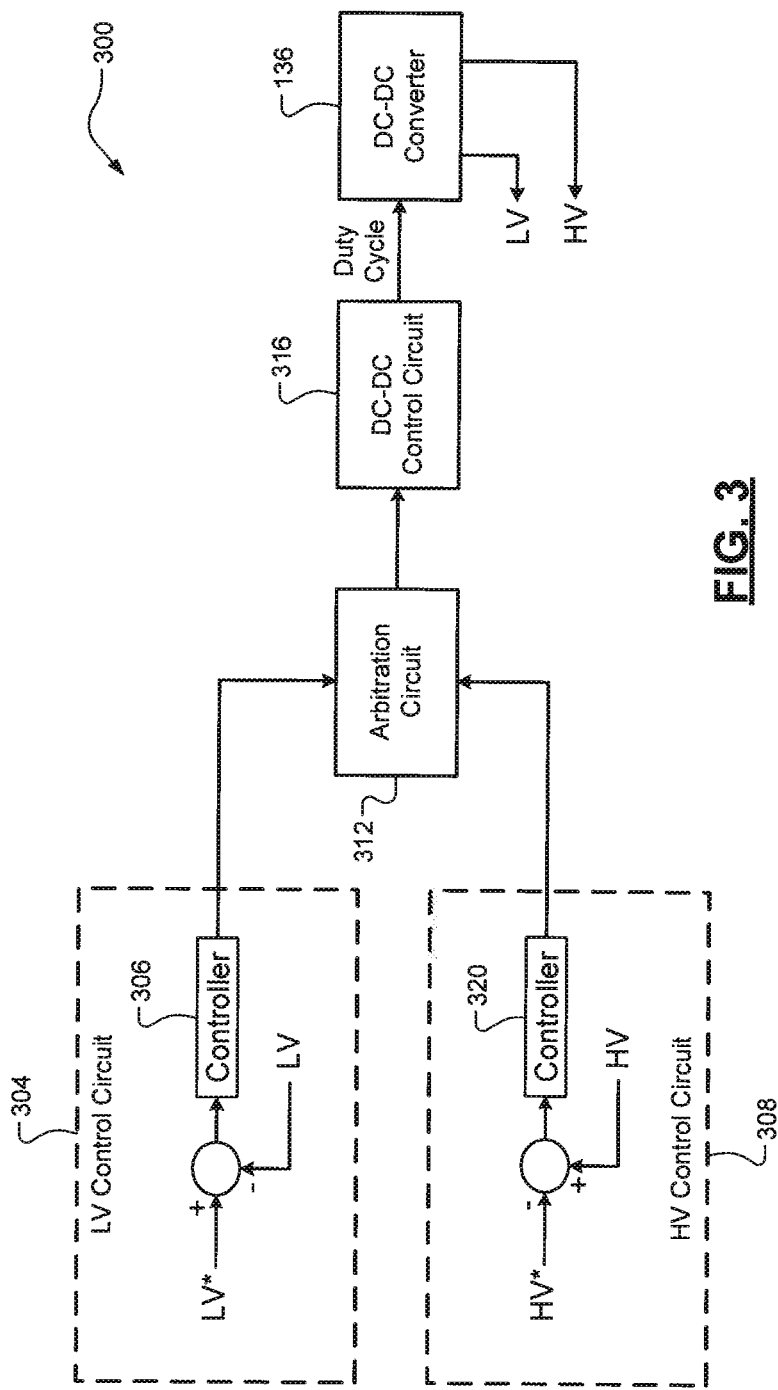
FIG. 3 is a functional block diagram of control circuits for a direct current to direct current (DC-DC) converter of the electrified powertrain according to the principles of the present disclosure.

Referring now to FIG. 3 and with continued reference to FIG. 2, a functional block diagram of a control system 300 for the DC-DC converter 136 is illustrated. The control system 300 comprises an LV control circuit 304, an HV control circuit 308, an arbitration circuit 312, and a DC-DC control circuit 316. It will be appreciated that the term "circuit" as used herein includes analog and/or digital implementations. The LV control circuit 304 and the HV control circuit 308 each have an associated controller 306 and 320, respectively. The arbitration circuit 312 receives LV and HV set points from the LV and HV control circuits 304 and 308, respectively. The arbitration circuit 312 then decides which set point to utilize. The DC-DC control circuit 316 receives the command output by the arbitration circuit 312 and generates a duty cycle for the DC-DC converter 136, which is connected to both the HV and LV buses 208 and 212, respectively. The LV control circuit 304 calculates the difference between an LV target voltage (LV*) and the actual voltage (LV) of the LV bus 212 ($LV_{error}=LV^{*}-LV$), which is used by the controller 306 to generate an LV setpoint. In one exemplary implementation, the controller 306 utilizes a proportional-integral (PI) or proportional-integral-derivative (PID) control scheme.

One unique portion of the control system 300 is the addition of the HV control circuit 308 while utilizing the other components (e.g., the DC-DC control circuit 316) that are typically utilized for LV control. In other words, the DC-DC converter 136 typically does not operate to stabilize the voltage of the HV bus 208. The HV control circuit 308 calculates a difference between the actual voltage (HV) of the HV bus 208 and an HV target voltage (HV*) ($HV_{error}=(HV^{*}-HV)$). This difference is utilized by controller 320 to generate an HV setpoint. For example only, the controller 320 could multiply the error by a gain (K) $HV_{error}=-(HV^{*}-HV)K$) or utilize a PI or PID control scheme. For example, the gain K could be tuned as needed for optimal HV bus stabilization.

Figure 4:
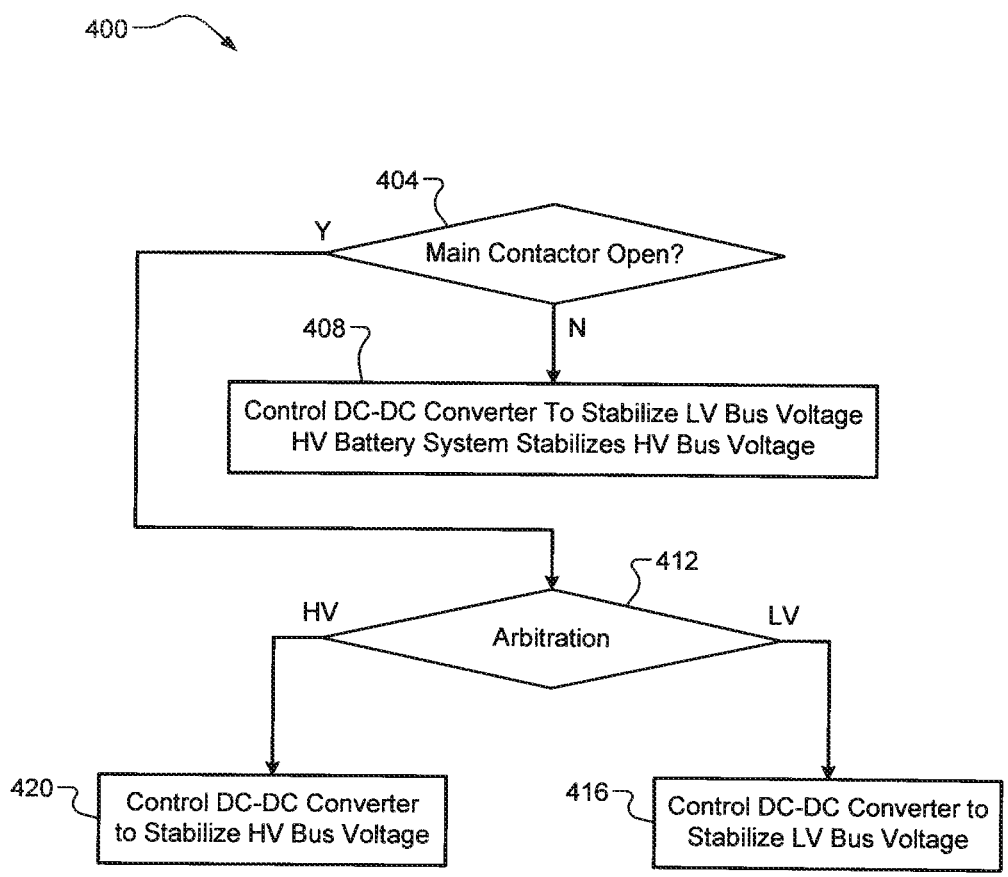
FIG. 4 is a flow diagram of an exemplary method for voltage control for an alternator mode in an electrified vehicle having a BSG unit according to the principles of the present disclosure.

Referring now to FIG. 4 and with continued reference to FIGS. 2-3, an example method 400 for stabilizing the HV bus voltage is illustrated. At 404, the control system determines whether the main contactor 204 is open or malfunctioning. Example conditions where this occurs have been discussed above. If the main contactor 204 is closed and not malfunctioning, the method 400 proceeds to 408 where the control system controls the DC-DC converter 136 to stabilize the voltage of the LV bus 212 and the HV battery system 132 stabilizes the voltage of the HV bus 208. This could be considered normal operation, i.e., not the alternator mode. The method 400 then ends or returns to 404. If the main contact is open or malfunctioning, however, the method 400 proceeds to 412. At 412, the control system performs arbitration to determine whether the DC-DC converter 136 should be stabilizing the voltage of the HV bus 208 or the LV bus 212.

This arbitration procedure could be performed by the control system based on various system parameters or inputs (e.g., voltages of the HV bus 208 and the LV bus 212). Even though the main contactor 204 may be open or malfunctioning, there could be scenarios where stabilizing the voltage of the LV bus 212 takes priority. For example, if the voltage of the LV bus 212 approached a certain threshold (e.g., 17 volts), the method 400 could proceed to 416 where the control system controls the DC-DC converter 136 to stabilize the voltage of the LV bus 212. Alternatively, the control system could determine to control the DC-DC converter to stabilize the voltage of the HV bus 208 at 420. Both of these operations 416, 420 could be performed temporarily and the method 400 could end or return to 404 for another cycle.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. This memory also stores, for example, the voltage regulation feedback setpoints discussed herein. The one or more processors may be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electrified powertrain of an electrified vehicle, the electrified powertrain comprising:
   a high voltage (HV) battery system connected to an HV bus;
   a motor generator unit (MGU) connected to the HV bus;

a main contactor disposed on the HV bus between the MGU and the HV battery system such that, when the main contactor is closed, the HV battery system stabilizes a voltage of the HV bus;

a low voltage (LV) battery system connected to a LV bus and configured to stabilize a voltage of the LV bus when the main contactor is open or malfunctioning;

a direct current to direct current (DC-DC) converter connected to the HV bus and the LV bus; and a controller configured to:
- when the main contactor is closed, control the DC-DC converter to stabilize the LV bus voltage; and
- when the main contactor is open or malfunctioning, control only the DC-DC converter without controlling the MGU to stabilize the HV bus voltage without charging any additional energy storage devices;
- wherein the controller includes a DC-DC control circuit that generates a duty cycle for the DC-DC converter based on a command signal; and the controller further includes a LV control circuit that generates a first error signal based on a difference between a target LV bus voltage and the LV bus voltage.

2. The electrified powertrain of claim 1, wherein the controller further includes:
- an HV control circuit that generates a second error signal based on a negative of a difference between a target HV bus voltage and the HV bus voltage; and
- an arbitrator circuit that receives the first and second error signals and that determines whether to output the first or second error signal to the DC-DC control circuit as the command signal.

3. The electrified powertrain of claim 2, wherein the HV control circuit generates the second error signal based on a product of (i) the negative of the difference between the target HV bus voltage and the HV bus voltage and (ii) a tunable gain factor.

4. The electrified powertrain of claim 2, wherein the HV control circuit further comprises a proportional-integral (PI) or proportional-integral-derivative (PID) controller.

5. The electrified powertrain of claim 2, wherein the arbitrator circuit prioritizes the first error signal from the LV control circuit over the second error signal from the HV control circuit in outputting the command signal.

6. The electrified powertrain of claim 1, wherein the main contactor opens in response to an ambient temperature outside of a predetermined operating range.

7. The electrified powertrain of claim 1, wherein the main contactor opens in response to a parameter of the HV battery system exceeding a threshold.

8. A method of controlling a direct current to direct current (DC-DC) converter of an electrified powertrain of an electrified vehicle, the method comprising:

determining, by a controller of the electrified powertrain, a state of a main contactor disposed on a high voltage (HV) bus between a motor generator unit (MGU) and an HV battery system;

in response to determining that the main contactor is open or malfunctioning, controlling, by the controller, only the DC-DC converter without controlling the MGU to stabilize a voltage of the HV bus without charging any additional energy storage devices;

in response to determining that the main contactor is closed, controlling, by the controller, the DC-DC converter to stabilize a voltage of a low voltage (LV) bus connected to an LV battery system; further comprising generating, by a DC-DC control circuit of the controller, a duty cycle for the DC-DC converter based on a command signal; and further comprising generating, by an LV control circuit of the controller, a first error signal based on a difference between a target LV bus voltage and the LV bus voltage wherein when the main contactor is closed, the HV battery system stabilizes the HV bus voltage and the LV battery system stabilizes the LV bus voltage.

9. The method of claim 8, further comprising:
- generating, by an HV control circuit of the controller, a second error signal based on a negative of a difference between a target HV bus voltage and the HV bus voltage;
- receiving, by an arbitrator circuit of the controller, the first and second error signals; and
- determining, by the arbitrator circuit, whether to output the first or second error signal to the DC-DC control circuit as the command signal.

10. The method of claim 9, further comprising generating, by the HV control circuit, the second error signal based on a product of (i) the negative of the difference between the target HV bus voltage and the HV bus voltage and (ii) a tunable gain factor.

11. The method of claim 9, wherein generating the second error signal further comprises utilizing a proportional-integral (PI) or proportional-integral-derivative (PID) controller.

12. The method of claim 9, further comprising prioritizing, by the arbitrator circuit, the first error signal from the LV control circuit over the second error signal from the HV control circuit in outputting the command signal.

13. The method of claim 8, wherein the main contactor opens in response to an ambient temperature outside of a predetermined operating range.

14. The method of claim 8, wherein the main contactor opens in response to a parameter of the HV battery system exceeding a threshold.

* * * * *